United States Patent
Nakamura et al.

(10) Patent No.: US 12,358,571 B2
(45) Date of Patent: Jul. 15, 2025

(54) MOVABLE SPOILER DEVICE

(71) Applicant: Honda Motor Co., Ltd., Tokyo (JP)

(72) Inventors: Yuki Nakamura, Tokyo (JP); Kei Ambo, Tokyo (JP); Kenichi Ando, Saitama (JP)

(73) Assignee: Honga Motor Co., Lts., Tokyo (JP)

( * ) Notice: Subject to any disclaimer, the term of this patent is extended or adjusted under 35 U.S.C. 154(b) by 402 days.

(21) Appl. No.: 18/171,668

(22) Filed: Feb. 21, 2023

(65) Prior Publication Data
US 2023/0202587 A1    Jun. 29, 2023

(30) Foreign Application Priority Data
Mar. 3, 2022    (CN) .......................... 202210208847.3

(51) Int. Cl.
    *B62D 35/00*       (2006.01)
(52) U.S. Cl.
    CPC ................................ *B62D 35/007* (2013.01)
(58) Field of Classification Search
    CPC ........ B62D 35/007; B62D 37/02; Y02T 10/82
See application file for complete search history.

(56) References Cited

U.S. PATENT DOCUMENTS

2007/0236044 A1* 10/2007 Froeschle ............ B62D 35/007
                                                               296/180.5

FOREIGN PATENT DOCUMENTS

JP         H02100883       8/1990
WO    WO-2020219438 A1 * 10/2020 ........... B62D 35/007

OTHER PUBLICATIONS

WO 2007095886 A1 (Year: 2007).*

* cited by examiner

*Primary Examiner* — Lori Lyjak
(74) *Attorney, Agent, or Firm* — JCIPRNET

(57) ABSTRACT

The invention provides a movable spoiler device, which may be easily stored and operated stably. The movable spoiler device includes a fixed plate fixed on a body of a vehicle; a movable plate disposed to be movable between a storage position connected to the fixed plate and an unfolding position closer to the rear position than the storage position; a linkage mechanism that is pivotally supported on the fixed plate at one end and pivotally supported on the movable plate at the other end; a sliding mechanism including a track portion disposed on one of the fixed plate and the movable plate, and a sliding portion disposed on the other of the fixed plate and the movable plate; and an actuator driving the linkage mechanism or the sliding mechanism to drive the movable plate to move relative to the fixed plate.

6 Claims, 6 Drawing Sheets

MOVABLE SPOILER DEVICE

CROSS-REFERENCE TO RELATED APPLICATION

This application claims the priority benefit of China application no. 202210208847.3, filed on Mar. 3, 2022. The entirety of the above-mentioned patent application is hereby incorporated by reference herein and made a part of this specification.

BACKGROUND

Technical Field

The disclosure relates to a movable spoiler device.

Description of Related Art

In the related art (JP Laid-Open No. H02-100883), typically a spoiler device may be provided at the rear end of the vehicle to improve the aerodynamic performance of the vehicle. A common vehicle spoiler device may be a fixed spoiler with a specific shape. Currently there are also spoiler devices that are set as a combination of a fixed plate and a movable plate, so that the movable plate may be movable relative to the fixed plate through a linkage mechanism in the front and rear directions of the vehicle to change its position, thereby adjusting the aerodynamic performance. However, if multiple linkages are used as the linkage mechanism to realize the above-mentioned movement of the movable spoiler device, additional arrangement of the storage space for the linkage mechanism is required. If a single linkage is used as the linkage mechanism to realize the above-mentioned movement of the movable spoiler device, the movement might be unstable.

SUMMARY

The disclosure provides a movable spoiler device, which may be easily stored and operated stably.

The disclosure provides a movable spoiler device, including: a fixed plate fixed on a body of a vehicle; a movable plate disposed in a manner of being movable between a storage position connected to the fixed plate and an unfolding position closer to the rear position than the storage position; a linkage mechanism disposed to be pivotally supported on the fixed plate at one end and pivotally supported on the movable plate at the other end; a sliding mechanism including a track portion disposed on one of the fixed plate and the movable plate as well as a sliding portion disposed on the other of the fixed plate and the movable plate, and the sliding portion is slidably disposed on the track portion; and an actuator driving the linkage mechanism or the sliding mechanism to drive the movable plate to move relative to the fixed plate.

Based on the above, in the movable spoiler device of the present disclosure, the linkage mechanism is set so that one end thereof is pivotally supported on the fixed plate, and the other end thereof is pivotally supported on the movable plate. The sliding mechanism includes a track portion disposed on one of the fixed plate and the movable plate as well as a sliding portion disposed on the other of the fixed plate and the movable plate, and the sliding portion is slidably disposed on the track portion. The actuator drives the linkage mechanism or the sliding mechanism to drive the movable plate to move relative to the fixed plate. In this way, in the case of using a single linkage as a linkage mechanism with a sliding mechanism to realize the above-mentioned movement of the movable spoiler device, the degree of freedom of the storage space of the linkage mechanism increases, and the stability of the above-mentioned movement may be maintained. Accordingly, the movable spoiler device of the present disclosure may be easily stored and stably operated.

In order to make the above-mentioned features and advantages of the present disclosure more comprehensible, the following specific embodiments are described in detail with reference to the accompanying drawings.

DESCRIPTION OF THE EMBODIMENTS

Figure 1:
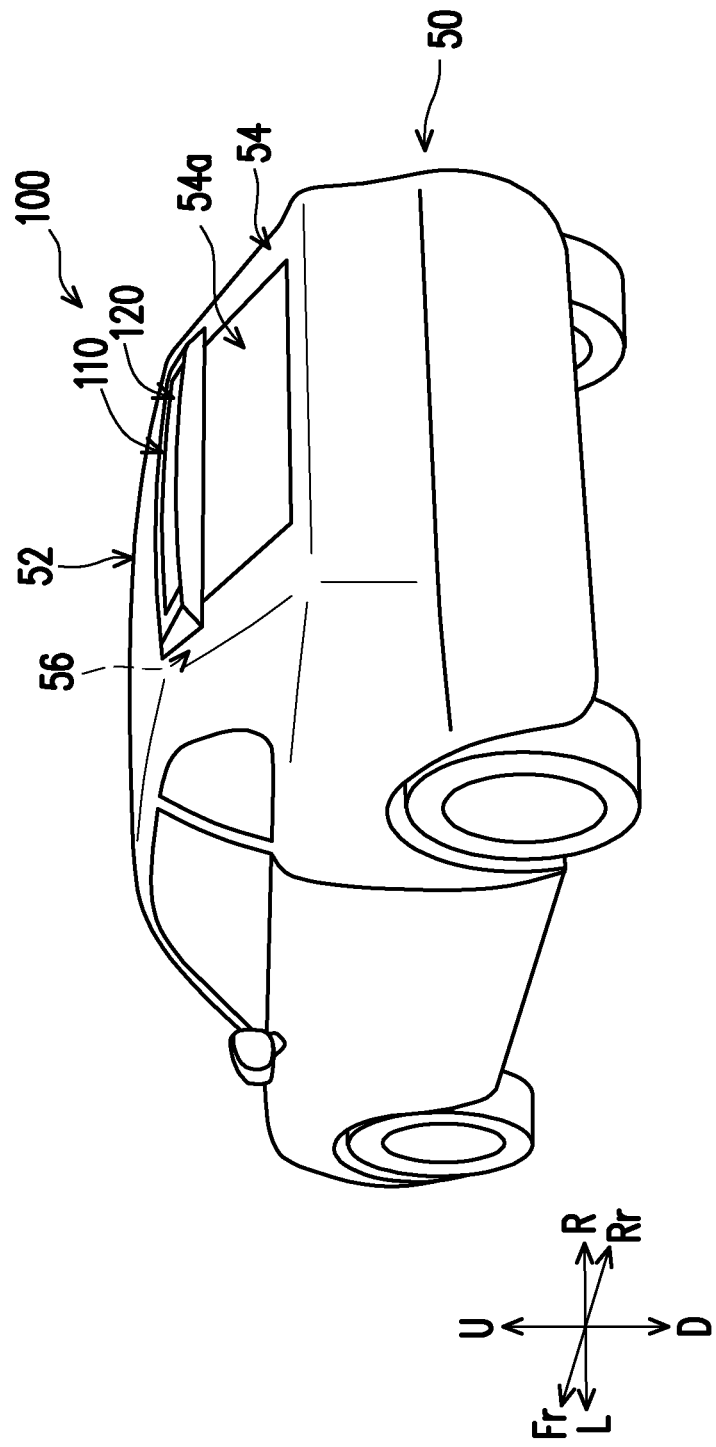
FIG. 1 is a schematic view of a movable spoiler device applied to a vehicle according to an embodiment of the present disclosure.
Figure 2:
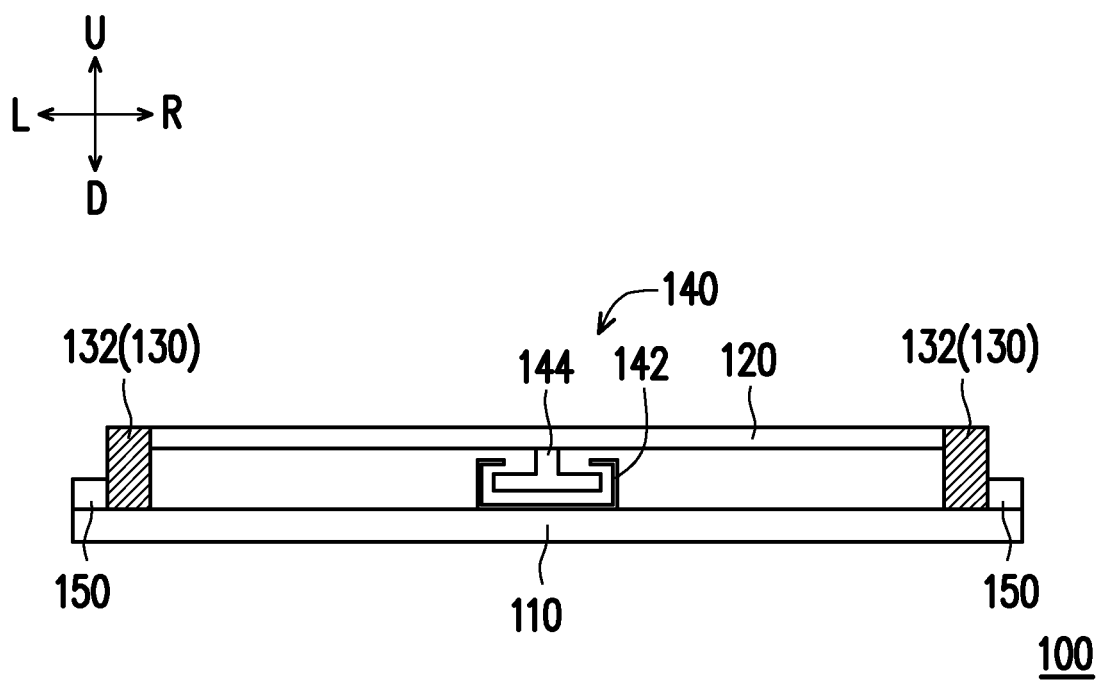
FIG. 2 is a schematic cross-sectional view of the movable spoiler device shown in FIG. 1 in a vehicle width direction.
Figure 3A:
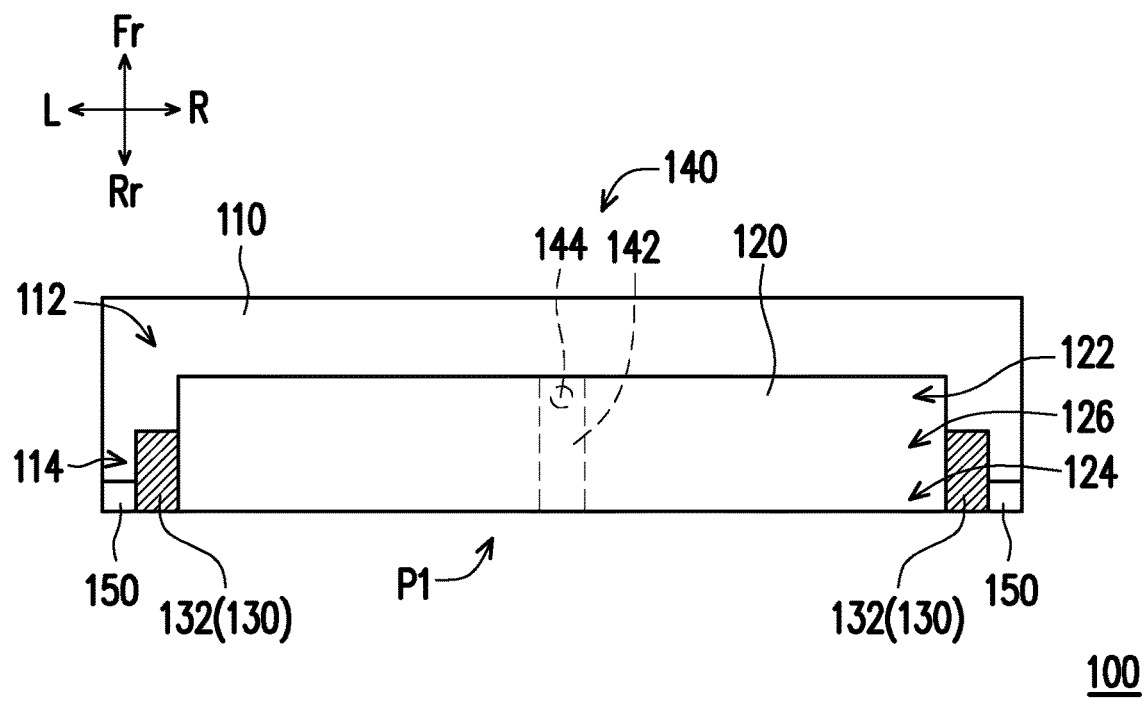
FIG. 3A and FIG. 3B are schematic top views of the movable spoiler device shown in FIG. 1 in a storage position and an unfolding position.
Figure 3B:
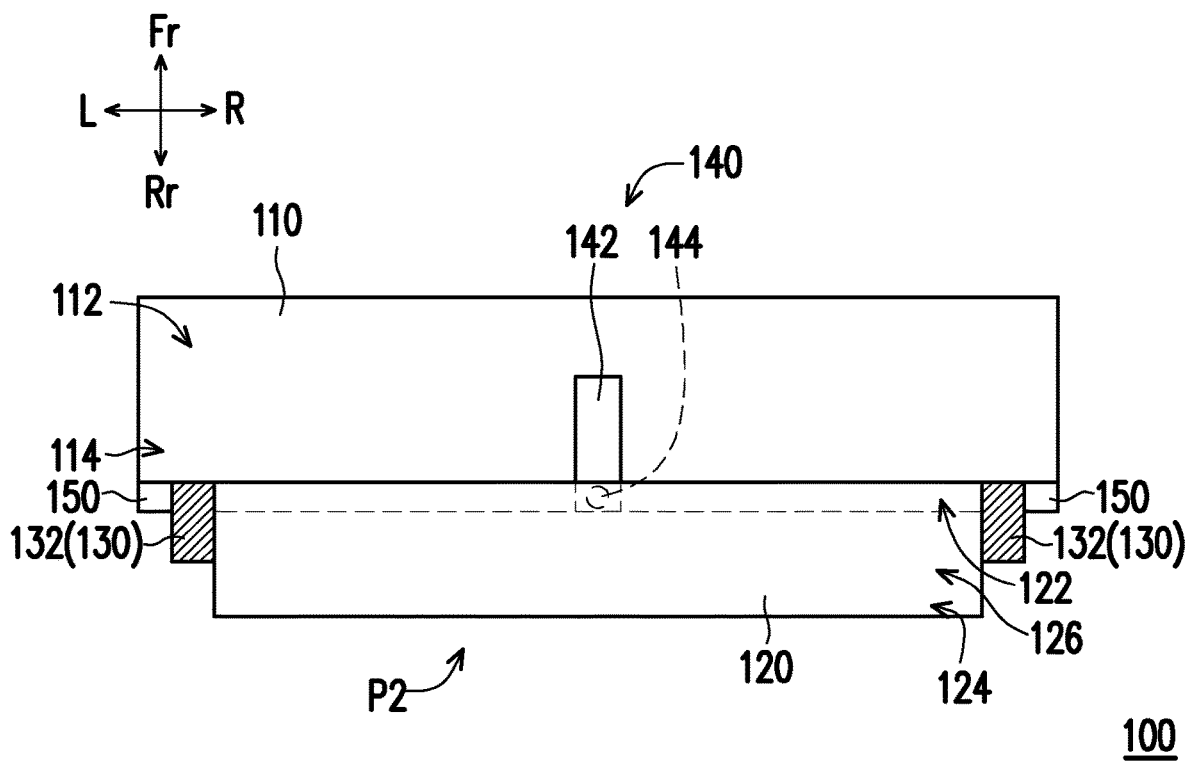

Reference will now be made in detail to the exemplary embodiments of the present disclosure, examples of which are illustrated in the accompanying drawings. FIG. 1 is a schematic view of a movable spoiler device applied to a vehicle according to an embodiment of the present disclosure. FIG. 2 is a schematic cross-sectional view of the movable spoiler device shown in FIG. 1 in a vehicle width direction. FIG. 3A and FIG. 3B are schematic top views of the movable spoiler device shown in FIG. 1 in a storage position and an unfolding position. FIG. 4A to FIG. 4F are schematic side views of the movable spoiler device shown in FIG. 1 in the process of moving from the storage position to the unfolding position. The application and specific structure of the movable spoiler device 100 of this embodiment will be described below with reference to FIG. 1 to FIG. 4F. The front and rear directions of the vehicle described in the following refers to, for example, the vehicle front direction Fr and the vehicle rear direction Rr in the drawings. The vehicle width direction refers to, for example, the vehicle left direction L and the vehicle right direction R in the drawings. The up and down directions of the vehicle refer to, for example, the vehicle up direction U and the vehicle down direction D in the drawings, but the above descriptions are only one example of the present disclosure, and the present disclosure is not limited thereto.

In an embodiment of the present disclosure, the linkage mechanism and the sliding mechanism are arranged separately in a vehicle width direction.

In an embodiment of the present disclosure, the angle of the movable plate is changed when the movable plate moves from the storage position to the unfolding position.

In an embodiment of the present disclosure, during the process of the movable plate moving from the storage position to a predetermined position on the way to the unfolding position, the angle of the movable plate is changed in an ascending direction of the rear portion relative to the angle of the movable plate at the storage position. During the process of the movable plate moving from the predetermined position to the unfolding position, the angle of the movable plate is changed in the descending direction of the rear portion relative to the angle of the movable plate at the predetermined position.

Please refer to FIG. 1, in this embodiment, the movable spoiler device 100 is adapted to be configured at the rear end of the vehicle 50 (shown in FIG. 1) as an exterior component, so as to stabilize the airflow passing through the vehicle 50, thereby improving aerodynamic performance. The movable spoiler device 100 is, for example, a long and narrow structure that spans the left and right sides of the vehicle 50 along the vehicle width direction (for example, the vehicle left direction L and the vehicle right direction R in FIG. 1). Moreover, the movable spoiler device 100 is disposed behind the roof 52 of the vehicle 50 and above the tailgate 54 of the vehicle 50, that is, at the junction between the roof 52 and the tailgate 54. However, in other embodiments that are not shown, the movable spoiler device 100 may be arranged under the rear glass 54a used in the tailgate 54 of the vehicle 50, and may also be arranged at other parts of the vehicle 50 according to requirements. The present disclosure does not limit the application of the movable spoiler device 100 on the vehicle 50, which may be adjusted according to requirements.

Specifically, in this embodiment, as shown in FIG. 1 to FIG. 4A, the movable spoiler device 100 includes a fixed plate 110, a movable plate 120, a linkage mechanism 130, a sliding mechanism 140, and an actuator 150. The fixed plate 110 is fixed on the body 56 of the vehicle 50. The movable plate 120 is disposed in a manner of being movable between a storage position P1 (shown in FIG. 3A) connected to the fixed plate 110 and an unfolding position P2 (shown in FIG. 3B) closer to the rear position (i.e., corresponding to one side of the vehicle rear direction Rr) than the storage position P1. The linkage mechanism 130 is disposed between the fixed plate 110 and the movable plate 120 (as shown in FIG. 2), so the movable plate 120 is adapted to move relative to the fixed plate 110 through the linkage mechanism 130. Similarly, the sliding mechanism 140 is disposed between the fixed plate 110 and the movable plate 120 (as shown in FIG. 2), so the movable plate 120 is adapted to move relative to the fixed plate 110 through the sliding mechanism 140. The actuator 150 drives the linkage mechanism 130 or the sliding mechanism 140 to drive the movable plate 120 to move relative to the fixed plate 110. That is to say, driven by the actuator 150, the movable plate 120 is movable between the storage position P1 and the unfolding position P2 through the linkage mechanism 130 and the sliding mechanism 140 (as shown in FIG. 3A and FIG. 3B).

Figure 4A:
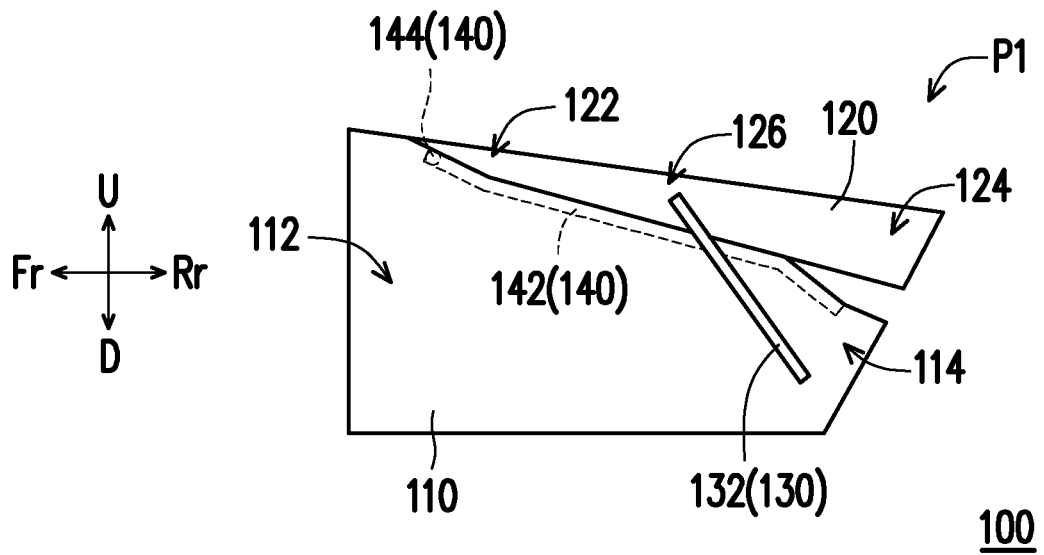
FIG. 4A to FIG. 4F are schematic side views of the movable spoiler device shown in FIG. 1 in the process of moving from the storage position to the unfolding position.
Figure 4B:
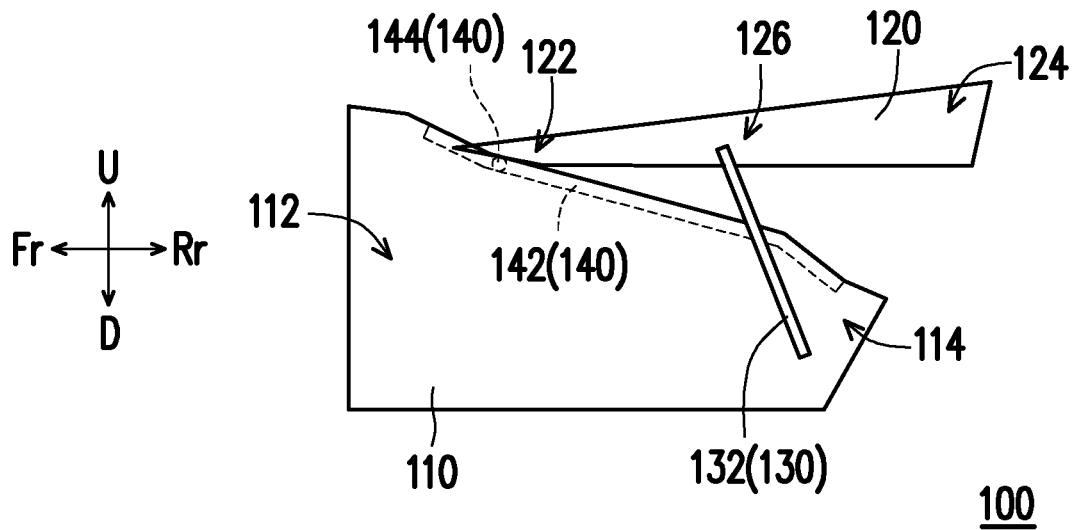

Furthermore, in this embodiment, the fixed plate 110 and the movable plate 120 refer to narrow and long plate structures, and are not limited to a single plate, and may also be a composite plate composed of multiple plates. Moreover, the storage position P1 refers to, for example, a position where the movable plate 120 is set above the fixed plate 110 (that is, corresponding to one side of the vehicle up direction U), so the movable plate 120 and the fixed plate 110 at least partially overlap to form a storage state (as shown in FIG. 3A and FIG. 4A). Correspondingly, the unfolding position P2 refers to, for example, a position where the movable plate 120 is located behind the fixed plate 110 (that is, one side corresponding to the vehicle rear direction Rr), so the movable plate 120 moves to the rear of the fixed plate 110 to form an unfolded state (as shown in FIG. 3B and FIG. 4F).

Furthermore, in this embodiment, as shown in FIG. 2 to FIG. 4A, the linkage mechanism 130 is, for example, a single linkage. For example, a pair of linkages 132 are provided on opposite sides of the fixed plate 110 and the movable plate 120 in the vehicle width direction as the linkage mechanism 130. The fixed plate 110 has a front portion 112 corresponding to the vehicle front direction Fr, and a rear portion 114 corresponding to the vehicle rear direction Rr, and the movable plate 120 has a front portion 122 corresponding to the vehicle front direction Fr, and a rear portion 124 corresponding to the vehicle rear direction Rr. A pair of linkages 132 as the linkage mechanism 130 is provided such that one end thereof (for example, one end corresponding to the vehicle down direction D) is pivotally supported on the fixed plate 110 (for example, connected to the rear portion 114 of the fixed plate 110), and the other end thereof (for example, one end corresponding to the vehicle up direction U) is pivotably supported on the movable plate 120 (e.g., the middle portion 126 connecting the front portion 122 and the rear portion 124 of the movable plate 120).

Thus, in this embodiment, by moving from the front position (i.e., one side corresponding to the vehicle front direction Fr) to the rear position (i.e., one side corresponding to the vehicle rear direction Rr) through a pair of linkages 132, the movable plate 120 moves to the rear position relative to the fixed plate 110, thereby moving from the storage position P1 to the unfolding position P2. Conversely, by moving from the rear position to the front position through the pair of linkages 132, the movable plate 120 moves forward relative to the fixed plate 110, thereby moving from the unfolding position P2 to the storage position P1.

Correspondingly, in this embodiment, as shown in FIG. 2 to FIG. 3B, the sliding mechanism 140 includes a track portion 142 disposed on one of the fixed plate 110 and the movable plate 120 (for example, the fixed plate 110), as well as a sliding portion 144 disposed on the other of the fixed plate 110 and the movable plate 120 (for example, the movable plate 120), and the sliding portion 144 is slidably disposed on the track portion 142. As shown in FIG. 3A and FIG. 3B, the track portion 142 extends from a position near the front portion 112 to the rear portion 114 of the fixed plate 110 along the front and rear directions of the vehicle, and the sliding portion 144 is disposed on the front portion 122 of the movable plate 120.

Thus, in this embodiment, through the movement of the sliding portion 144 moving from the front position to the rear position relative to the track portion 142, the movable plate 120 moves to the rear position relative to the fixed plate 110, thereby moving from the storage position P1 to the unfolding position P2. Conversely, through the movement of the sliding portion 144 moving from the rear position to the front position relative to the track portion 142, the movable plate 120 moves to the front position relative to the fixed plate 110, thereby moving from the unfolding position P2 to the storage position P1. In addition, rollers (not shown) may also be provided on the left and right sides of the sliding portion 144 shown in FIG. 2. With such a configuration, when the sliding portion 144 moves from the front position to the rear position relative to the track portion 142, the angle of the sliding portion 144 relative to the track portion 142 may be changed more stably. However, in other embodiments that are not shown, it is also possible that the track portion 142 is disposed on the movable plate 120 and the sliding portion 144 is disposed on the fixed plate 110, the present disclosure is not limited thereto.

In addition, in this embodiment, as shown in FIG. 3A and FIG. 3B, a pair of linkages 132 of the linkage mechanism 130 are arranged on opposite sides of the fixed plate 110 and the movable plate 120 in the vehicle width direction, and the track portion 142 and the sliding portion 144 of the sliding mechanism 140 are provided at substantially the middle position in the vehicle width direction between the fixed plate 110 and the movable plate 120, so that the pair of linkages 132 serving as the linkage mechanism 130 are provided on opposite sides of the track portion 142 and the sliding portion 144 serving as the sliding mechanism 140. In this manner, the linkage mechanism 130 and the sliding mechanism 140 are provided apart from each other in the vehicle width direction. However, in other embodiments that are not shown, a pair of sliding mechanisms 140 may also be provided on opposite sides of the fixed plate 110 and the movable plate 120 in the vehicle width direction, and a linkage mechanism 130 may be provided at substantially the middle positon, so that the sliding mechanism 140 is disposed on opposite sides of the linkage mechanism 130. The present disclosure does not limit the number and positions of the linkage mechanism 130 and the sliding mechanism 140, which may be adjusted according to requirements.

Furthermore, in this embodiment, as shown in FIG. 3A and FIG. 3B, a pair of actuators 150 disposed between the fixed plate 110 and the movable plate 120 are also disposed, for example, in the vehicle width direction (for example, disposed on the fixed plate 110) to respectively drive a pair of left and right linkages 132 serving as the linkage mechanism 130. However, in other embodiments that are not shown, an actuator 150 may also be provided at substantially the middle position in the vehicle width direction to drive the sliding mechanism 140, or in an embodiment using a pair of left and right sliding mechanisms 140, a pair of left and right actuators 150 are used to respectively drive a pair of left and right sliding mechanisms 140. The present disclosure does not limit the number and position of the actuators 150, which may be adjusted according to requirements.

It can be seen that, in this embodiment, the actuator 150 drives one of the linkage mechanism 130 and the sliding mechanism 140 to drive the movable plate 120 to move relative to the fixed plate 110, while the other one of the linkage mechanism 130 and the sliding mechanism 140 not directly driven by the actuator 150 serves as an auxiliary mechanism to assist the movement of the movable plate 120 relative to the fixed plate 110. In this manner, driven by the actuator 150, the movable plate 120 is movable between the storage position P1 and the unfolding position P2 through the linkage mechanism 130 and the sliding mechanism 140 (as shown in FIG. 4A to FIG. 4F). In this way, compared to the practice of using multiple linkages as the linkage mechanism, when using a single linkage as the linkage mechanism 130 with the sliding mechanism 140 to realize the above-mentioned movement of the movable spoiler device 100, the degree of freedom of the storage space of the linkage mechanism 130 is increased, and the stability of the above-mentioned movement may be maintained. Accordingly, the movable spoiler device 100 may be easily stored and stably operated.

In addition, in this embodiment, as shown in FIG. 4A to FIG. 4F, when the movable plate 120 moves from the storage position P1 to the unfolding position P2, the angle of the movable plate 120 is changed. Preferably, during the process of the movable plate 120 moving from the storage position P1 to a predetermined position P3 on the way to the unfolding position P2, that is, changing from the state of FIG. 4A to the state of FIG. 4C, the angle of the movable plate 120 is changed in an ascending direction of the rear portion 124 relative to the angle of the movable plate 120 at the storage position P1. During the process of the movable plate 120 moving from the predetermined position P3 to the unfolding position P2, that is, changing from the state of FIG. 4D to the state of FIG. 4F, the angle of the movable plate 120 is changed in a descending direction of the rear portion 124 relative to the angle of the movable plate 120 at the predetermined position P3. In addition, the angle of the movable plate 120 may also be changed such that the rear portion 124 is raised higher than the front portion 122 during transition from the state of FIG. 4A to the state of FIG. 4C. Likewise, the angle of the movable plate 120 may also be changed such that the rear portion 124 is lower than the front portion 122 during the transition from the state of FIG. 4D to the state of FIG. 4F.

Specifically, in this embodiment, when the movable plate 120 moves between the storage position P1 and the unfolding position P2 through the linkage mechanism 130 and the sliding mechanism 140, the sliding portion 144 provided on the front portion 122 of the movable plate 120 slides relative to the track portion 142 extending along the front and rear directions of the vehicle by moving from the front position to the rear position or moving from the rear position to the front position, so that the front portion 122 of the movable plate 120 moves from the front portion 112 to the rear portion 114 of the fixed plate 110 or from the rear portion 114 to the front portion 112 along the surface of the fixed plate 110. Moreover, a pair of linkages 132 disposed on the middle portion 126 of the movable plate 120 moves from the front position to the rear position or from the rear position to the front position to drive the movable plate 120 to move relative to the fixed plate 110. The movement of the pair of linkages 132 serving as the linkage mechanism 130 is performed in a manner that, for example, one end (for example, the end portion corresponding to the vehicle up direction U) connected to the movable plate 120 moves in an arc with the other end (for example, the end portion corresponding to the vehicle down direction D) connected to the fixed plate 110 as the center point, but the disclosure is not limited thereto.

Therefore, in this embodiment, as the pair of linkages 132 serving as the linkage mechanism 130 moves in an arc from the front position to the rear position and from the bottom to the top, the front portion 122 of the movable plate 120 maintains the connection (i.e., sliding mechanism 140) with the fixed plate 110, and the middle portion 126 of the movable plate 120 is lifted by the movement of the pair of linkages 132, so that the rear portion 124 of the movable plate 120 is also lifted. In this manner, during the process of the movable plate 120 moving from the storage position P1 to the predetermined position P3 on the way to the unfolding position P2, that is, changing from the state of FIG. 4A to the state of FIG. 4C, the angle of the movable plate 120 is changed in the ascending direction of the rear portion 124 relative to the angle of the movable plate 120 at the storage position P1. Correspondingly, when passing through the predetermined position P3, as the pair of linkages 132 serving as the linkage mechanism 130 moves in an arc from the front position to the rear position and from top to bottom, the front portion 122 of the movable plate 120 maintains the connection (i.e., the sliding mechanism 140) with the fixed plate 110, and the middle portion 126 of the movable plate 120 is lowered by the movement of the pair of linkages 132, so that the rear portion 124 of the movable plate 120 is also lowered. In this manner, when the movable plate 120 moves from the predetermined position P3 to the unfolding position P2, that is, changing from the state shown in FIG. 4D to the state shown in FIG. 4F, the angle of the movable plate 120 is changed in the descending direction of the rear portion 124 relative to the angle of the movable plate 120 at the predetermined position P3.

Figure 4C:
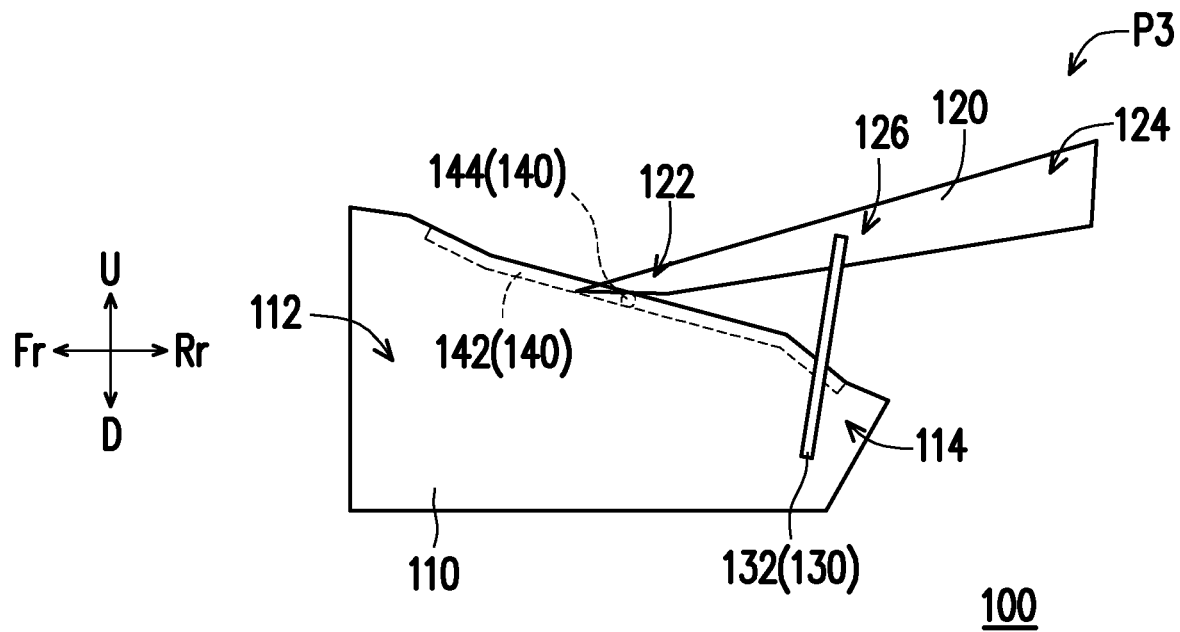
Figure 4D:
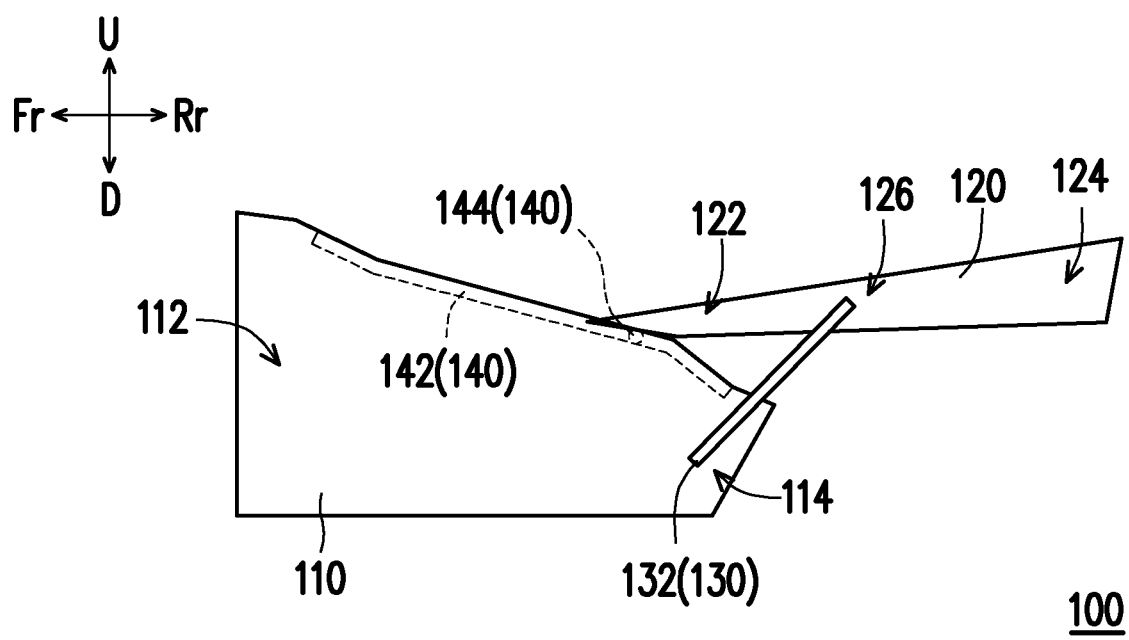
Figure 4E:
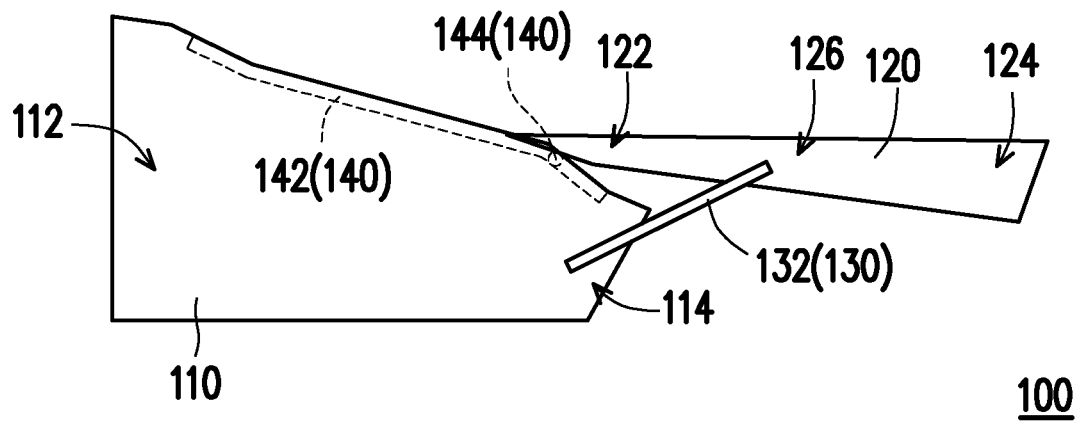
Figure 4F:
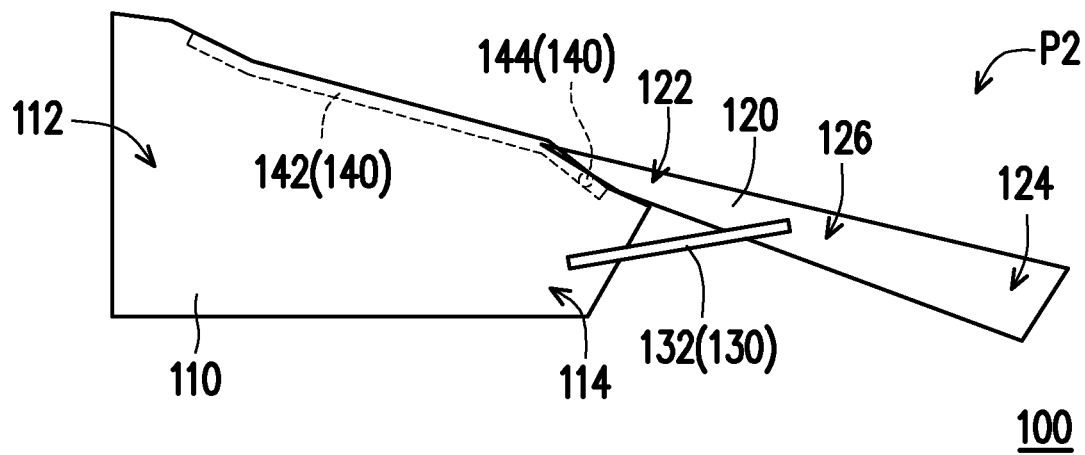

Therefore, in this embodiment, the predetermined position P3 is preferably a position (for example, the position corresponding to the state shown in FIG. 4C) where the pair of linkages 132 serving as the linkage mechanism 130 moves in an arc and the movement of the pair of linkages 132 starts to descend, but the present disclosure is not limited thereto. Furthermore, by adjusting the surface shape of the fixed plate 110, or adjusting the structures and connection positions of the linkage mechanism 130 and the sliding mechanism 140, it is possible to make arrangement to the angle change of the movable plate 120. In other embodiments that are not shown, in the process of the movable plate 120 moving from the storage position P1 to the unfolding position P2, it may be that the angle is changed such that the rear portion 124 is lower than the front portion 122, and only the magnitude of the angle is adjusted. The present disclosure is not limited to the above embodiments, which may be adjusted according to requirements.

To sum up, in the movable spoiler device of the present disclosure, the linkage mechanism is arranged such that one end thereof is pivotally supported on the fixed plate, and the other end thereof is pivotally supported on the movable plate, and the sliding mechanism includes a track portion disposed on one of the fixed plate and the movable plate, as well as a sliding portion disposed on the other of the fixed plate and the movable plate, and the sliding portion is slidably arranged on the track portion. The actuator drives the linkage mechanism or the sliding mechanism to drive the movable plate to move relative to the fixed plate. Preferably, when the movable plate moves from the storage position to the unfolding position, the angle of the movable plate is changed. In this way, in the case of using a single linkage as a linkage mechanism with a sliding mechanism to realize the above-mentioned movement of the movable spoiler device, the degree of freedom of the storage space of the linkage mechanism increases, and the stability of the above-mentioned movement may be maintained. It is also possible to change the angle of the moving movable plate. Accordingly, the movable spoiler device of the present disclosure may be easily stored and stably operated.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. A movable spoiler device, comprising:
    a fixed plate fixed on a body of a vehicle;
    a movable plate disposed in a manner of being movable between a storage position connected to the fixed plate and an unfolding position closer to a rear position than the storage position;
    a linkage mechanism disposed to be pivotally supported on the fixed plate at one end and pivotally supported on the movable plate at the other end;
    a sliding mechanism comprising a track portion disposed on one of the fixed plate and the movable plate, and a sliding portion disposed on the other of the fixed plate and the movable plate, wherein the sliding portion is slidably disposed on the track portion; and
    an actuator driving the linkage mechanism or the sliding mechanism to drive the movable plate to move relative to the fixed plate.

2. The movable spoiler device according to claim 1, wherein the linkage mechanism and the sliding mechanism are disposed separately in a vehicle width direction.

3. The movable spoiler device according to claim 1, wherein an angle of the movable plate is changed when the movable plate moves from the storage position to the unfolding position.

4. The movable spoiler device according to claim 3, wherein during a process of the movable plate moving from the storage position to a predetermined position on the way to the unfolding position, the angle of the movable plate is changed in an ascending direction of a rear portion relative to an angle of the movable plate at the storage position,
    during a process of the movable plate moving from the predetermined position to the unfolding position, the angle of the movable plate is changed in a descending direction of the rear portion relative to an angle of the movable plate at the predetermined position.

5. The movable spoiler device according to claim 2, wherein an angle of the movable plate is changed when the movable plate moves from the storage position to the unfolding position.

6. The movable spoiler device according to claim 5, wherein during a process of the movable plate moving from the storage position to a predetermined position on the way to the unfolding position, the angle of the movable plate is changed in an ascending direction of a rear portion relative to an angle of the movable plate at the storage position,
    during a process of the movable plate moving from the predetermined position to the unfolding position, the angle of the movable plate is changed in a descending direction of the rear portion relative to an angle of the movable plate at the predetermined position.

* * * * *